(12) United States Patent
Thompson et al.

(10) Patent No.: US 10,577,034 B2
(45) Date of Patent: Mar. 3, 2020

(54) MODIFYING AERODYNAMIC PERFORMANCE OF A VEHICLE

(71) Applicant: Jaguar Land Rover Limited, Whitley, Coventry, Warwickshire (GB)

(72) Inventors: Christopher Thompson, Coventry (GB); Adrian Gaylard, Coventry (GB)

(73) Assignee: Jaguar Land Rover Limited, Coventry, Warwickshire (GB)

( * ) Notice: Subject to any disclaimer, the term of this patent is extended or adjusted under 35 U.S.C. 154(b) by 0 days.

(21) Appl. No.: 15/754,548

(22) PCT Filed: Sep. 2, 2016

(86) PCT No.: PCT/EP2016/070754
§ 371 (c)(1),
(2) Date: Feb. 22, 2018

(87) PCT Pub. No.: WO2017/037251
PCT Pub. Date: Mar. 9, 2017

(65) Prior Publication Data
US 2018/0229780 A1    Aug. 16, 2018

(30) Foreign Application Priority Data
Sep. 4, 2015    (GB) .................................... 1515707.6

(51) Int. Cl.
*B62D 35/00*    (2006.01)
*B62D 37/00*    (2006.01)
(Continued)

(52) U.S. Cl.
CPC .......... *B62D 35/005* (2013.01); *B60K 11/085* (2013.01); *B62D 37/02* (2013.01); *Y02T 10/82* (2013.01); *Y02T 10/88* (2013.01)

(58) Field of Classification Search
CPC ......... B60K 11/00; B60K 11/04; B60K 11/08; B60K 11/085; B62D 25/12; B62D 25/105;
(Continued)

(56) References Cited

U.S. PATENT DOCUMENTS 4,379,582 A * 4/1983 Miwa .................. B62D 35/005
296/180.5
6,302,228 B1   10/2001 Cottereau et al.
(Continued)

FOREIGN PATENT DOCUMENTS

CN    102826004 A    12/2012
CN    102991340 A    3/2013
(Continued)

OTHER PUBLICATIONS

English translation of DE 10 2013 203 445; retreived via PatentTranslate loacted at www.epo.org. (Year: 2019).*
(Continued)

*Primary Examiner* — Jason S Daniels
(74) *Attorney, Agent, or Firm* — Myers Bigel, P.A.

(57) ABSTRACT

Embodiments of the present invention provide airflow apparatus for a vehicle comprising: an airflow duct extending rearwardly from a front region of said vehicle, the airflow duct having an airflow inlet and an airflow outlet; a cooling duct, separate from the airflow duct, the cooling duct having a cooling inlet and a cooling outlet, wherein the airflow outlet is in proximity to the cooling outlet such that, in use, airflow through said airflow outlet influences airflow through said cooling outlet, the cooling outlet and/or the airflow outlet is in a bonnet of the vehicle and, in use, airflow exits the airflow outlet substantially parallel said bonnet.

16 Claims, 4 Drawing Sheets

(51) Int. Cl.
*B60K 11/08* (2006.01)
*B62D 37/02* (2006.01)

(58) Field of Classification Search
CPC ...... B62D 35/00; B62D 35/005; B62D 37/02; Y02T 10/52
USPC .......................................... 296/180.1, 180.2
See application file for complete search history.

(56) References Cited

U.S. PATENT DOCUMENTS

| | | | | |
|---|---|---|---|---|
| 6,447,049 | B1 * | 9/2002 | Tohda | B60R 19/12 296/180.1 |
| 9,744,848 | B2 * | 8/2017 | Ho | B60K 11/085 |
| 2003/0178870 | A1 | 9/2003 | Angelo et al. | |
| 2012/0292122 | A1 | 11/2012 | Verbrugge | |
| 2013/0316634 | A1 * | 11/2013 | Ajisaka | B60H 1/3407 454/152 |
| 2015/0321547 | A1 * | 11/2015 | Pickl | F01P 11/08 180/68.1 |
| 2016/0016617 | A1 | 1/2016 | Wolf | |
| 2018/0229598 | A1 * | 8/2018 | Lambert | B60K 11/085 |

FOREIGN PATENT DOCUMENTS

| | | | |
|---|---|---|---|
| CN | 203410528 U | 1/2014 | |
| DE | 2 148 309 | 4/1973 | |
| DE | 10 2008 019 923 A1 | 10/2009 | |
| DE | 10 2013 203 445 A1 | 8/2014 | |
| JP | 61150824 A * | 7/1986 | ............ B60K 11/04 |
| JP | 7-196052 A | 8/1995 | |
| JP | 2569200 B2 | 1/1997 | |
| NL | 2002706 | 10/2010 | |

OTHER PUBLICATIONS

Patents Act 1977: Combined Search and Examination Report under Sections 17 and 18(3), UKIPO Application No. GB1515707.6, dated Mar. 11, 2016, 7 pp.
Patents Act 1977: Combined Search and Examination Report under Sections 17 and 18(3), UKIPO Application No. GB1614920.5, dated Mar. 3, 2017, 5 pp.
International Search Report, International Application No. PCT/EP2016/070754, dated Nov. 25, 2016, 3 pp.
Written Opinion of the International Searching Authority, International Application No. PCT/EP2016/070754, dated Nov. 25, 2016, 6 pp.
First Office Action and English language translation, CN Application No. 201680051153.6, dated Nov. 1, 2019, 24 pp.

* cited by examiner

MODIFYING AERODYNAMIC PERFORMANCE OF A VEHICLE

RELATED APPLICATIONS

This application is a 35 U.S.C. § 371 national stage application of PCT Application No. PCT/EP2016/070754, filed on Sep. 2, 2016, which claims priority from Great Britain Patent Application No. 1515707.6, filed on Sep. 4, 2015, the contents of which are incorporated herein by reference in their entireties. The above-referenced PCT International Application was published in the English language as International Publication No. WO 2017/037251 A1 on Mar. 9, 2017.

TECHNICAL FIELD

The present disclosure relates to modifying aerodynamic performance of a vehicle. Aspects of the invention relate to airflow apparatus, a vehicle, a method of cooling one or more components of a vehicle and a method of modifying aerodynamic performance and simultaneously cooling of one or more components of a vehicle.

BACKGROUND

Aerodynamics plays a key role in the design of vehicles, such as motor or road vehicles (cars, vans, trucks etc). Particular attention is paid to the aerodynamic drag force, as it directly affects fuel consumption and greenhouse gas emissions (notably $CO_2$). In particular, bluff-fronted vehicles such as SUVs have a relatively high aerodynamic drag associated with their front surfaces. Various vehicle components are accordingly designed so as to optimise the aerodynamic performance of a vehicle.

It is an object of embodiments of the invention to at least mitigate one or more of the problems of the prior art.

SUMMARY OF THE INVENTION

Aspects and embodiments of the invention provide airflow apparatus, a vehicle, a method of cooling one or more components of a vehicle and a method of modifying aerodynamic performance and simultaneously cooling of one or more components of a vehicle as claimed in the appended claims.

According to an aspect of the invention, there is provided airflow apparatus for a vehicle comprising:

an airflow duct extending rearwardly from a front region of said vehicle, the airflow duct having an airflow inlet and an airflow outlet;

a cooling duct, separate from the airflow duct, the cooling duct having a cooling inlet and a cooling outlet, wherein the airflow outlet is in proximity to the cooling outlet.

In an embodiment, the airflow outlet is in proximity to the cooling outlet such that, in use, airflow through said airflow outlet influences airflow through said cooling outlet.

The proximity of the airflow outlet to the cooling outlet is such that, in use, airflow through said airflow outlet may influence airflow through the cooling outlet by reducing pressure at said cooling outlet, for example by creating a region of low pressure at the cooling outlet. The airflow through the cooling duct may be coupled with the airflow through the airflow duct by virtue of the proximity of their respective outlets such that airflow through said cooling outlet is increased.

The proximity of the airflow outlet to the cooling outlet is close enough for the airflow through the cooling duct, exiting the cooling outlet to be influenced by the airflow through the airflow duct, exiting the airflow outlet. The proximity may be such that the airflow outlet is adjacent the cooling outlet. In an embodiment, the proximity is such that the airflow outlet is coincident with the cooling outlet, meaning they have at least one point in common.

In an embodiment, the cooling inlet and/or the airflow inlet is at a front edge of the vehicle.

In an embodiment, the cooling outlet and/or the airflow outlet is in a bonnet of the vehicle. In an embodiment, airflow exits the cooling outlet and/or the airflow outlet substantially parallel said bonnet. This contributes to the desirable laminar airflow over the bonnet.

The cooling duct may include a heat exchanger system for cooling one or more components of the vehicle and from which heat can be removed by the airflow through the cooling duct. The heat exchanger system may be located in the engine bay.

In an embodiment, the cooling duct and/or the airflow duct includes a deployable closure means adapted and arranged to close the cooling duct and/or airflow duct when in a deployed position and to open the cooling duct and/or airflow duct when in a retracted position. The deployable closure means may be adapted and arranged to close the cooling inlet and/or the airflow inlet.

The deployable closure means may have an outer surface which aligns with an outer surface of one or more vehicle body panels when the deployable closure means is in the deployed position to form a substantially continuous exterior surface. The airflow apparatus may comprise a control system for controlling deployment of the deployable closure means dependent upon an operating parameter associated with the vehicle. The operating parameter may be a current speed of the vehicle, a temperature of a heat exchanger system or a temperature of fluid flowing through a heat exchanger system.

According to another aspect of the invention there is a vehicle including airflow apparatus according to any of the preceding paragraphs.

According to another aspect of the invention there is provided a method of cooling one or more components of a vehicle comprising:

passing air through an airflow duct extending rearwardly from a front region (10) of said vehicle;

passing air through a cooling duct, separate from the airflow duct, wherein an airflow outlet of said airflow duct is located in proximity to a cooling outlet of said cooling duct such that airflow through said airflow outlet influences airflow through said cooling outlet.

According to another aspect of the invention there is provided a method of modifying aerodynamic performance and simultaneously cooling one or more components of a vehicle using airflow apparatus as described in any of the preceding paragraphs, the method comprising:

in dependence on a determination that an operating parameter associated with the vehicle has satisfied at least one predetermined criterion, moving at least one of said deployable closure means to one of a deployed position in which the or each closure means is positioned to close at least one of said airflow duct and said cooling duct and a retracted position in which the or each closure means is moved to open at least one of the airflow duct and the cooling duct. In an embodiment, airflow through said airflow outlet influences airflow through said cooling outlet.

According to another aspect of the invention there is provided a method of modifying aerodynamic performance and simultaneously cooling of one or more components of a vehicle comprising:

in dependence on a determination that an operating parameter associated with the vehicle has satisfied at least one predetermined criterion, moving at least one deployable closure means to one of a deployed position in which the or each closure means is positioned to close at least one of an airflow duct and a cooling duct and a retracted position in which the or each closure means is moved to open at least one of the airflow duct and the cooling duct;

wherein said airflow duct having an airflow inlet and an airflow outlet and said cooling duct, separate from the airflow duct, having a cooling inlet and a cooling outlet are located such that airflow through said airflow outlet influences airflow through said cooling outlet.

In an embodiment, an outer surface of the or each closure means aligns with an outer surface of one or more vehicle body panels when the closure means is in the deployed position to form a substantially continuous exterior surface.

In an embodiment, the method comprises progressively deploying the or each deployable closure means dependent on said operating parameter. In an embodiment, the operating parameter is a current speed of the vehicle, a temperature of a heat exchanger system or a temperature of fluid flowing through a heat exchanger system.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying drawings, in which.

DETAILED DESCRIPTION

Figure 1:
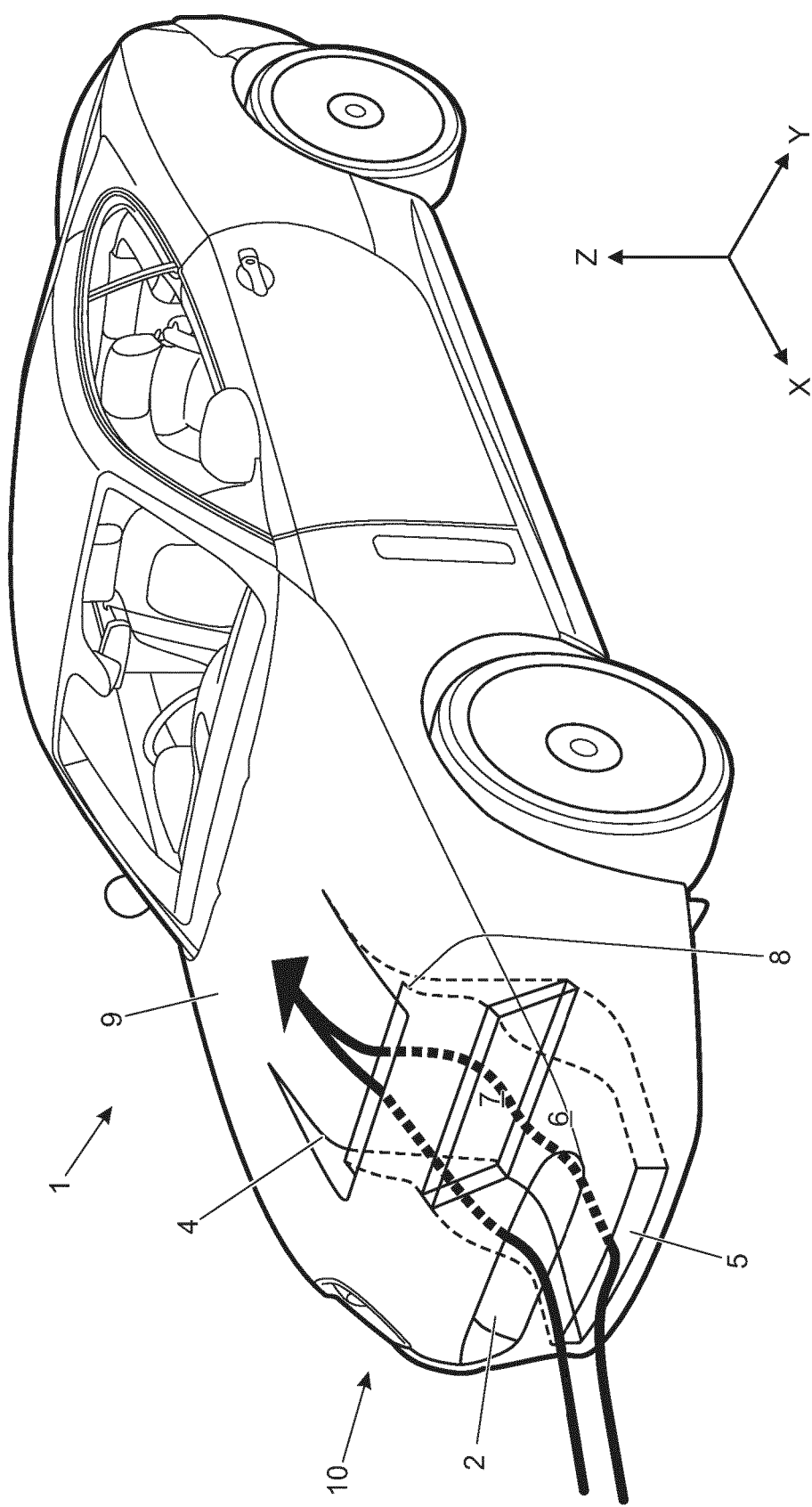
FIG. 1 is a front perspective view of a vehicle in accordance with an embodiment of the invention.

A vehicle 1 is illustrated in FIG. 1. The vehicle 1 comprises a front region 10, a front edge 11, an airflow inlet 2, a cooling inlet 5 and a bonnet 9. A front part (including front region 10) of the vehicle 1 is shown in cross-section in FIG. 2. FIG. 3 shows the airflow around the front part of the vehicle 1.

The cooling inlet 5 is for accommodating airflow to cool one or more components of the vehicle 1. The cooling inlet 5 is defined by an opening in the front region 10 of the vehicle 1 which allows air from outside the vehicle 1 to be channelled towards a component bay (not shown) in the front part of the vehicle 1. The cooling inlet 5 may be at a front edge 11 of the vehicle 1. The air is channelled through a cooling duct 6 which contains a heat exchanger system 7, from which heat can be removed by the channelled air, and exits the cooling duct 6 at a cooling outlet 8 in the bonnet 9 of the vehicle 1. A grille (not shown) may be positioned within the cooling duct 6 near the cooling inlet 5 and acts to filter unwanted objects such as leaves and stones from entering the component bay.

The component bay is at least partly covered by the bonnet 9 and may house a prime mover (not shown) for the vehicle. The prime mover could be any suitable prime mover including an electric machine, an internal combustion engine or a combination of an internal combustion engine and an electric machine. Alternatively, in vehicles where the engine is at the rear of the vehicle, the component bay does not contain the prime mover but may for example comprise a luggage space for receiving luggage or other removable components. Where the component bay comprises an engine bay for housing the prime mover the component bay may for part of the cooling duct. The channelling of air from outside the vehicle 1, via the cooling inlet 5 to the component bay may in one embodiment therefore allow, for example, a cooling of components housed within the component bay. Alternatively the prime mover may be isolated from the cooling duct and jus a heat exchanger for removing heat from the vehicle may be located in the cooling duct.

The airflow inlet 2 allows air from outside the vehicle 1 to be channelled into an airflow duct 3. The airflow duct 3 is a separate duct to the cooling duct 6.

Figure 2:
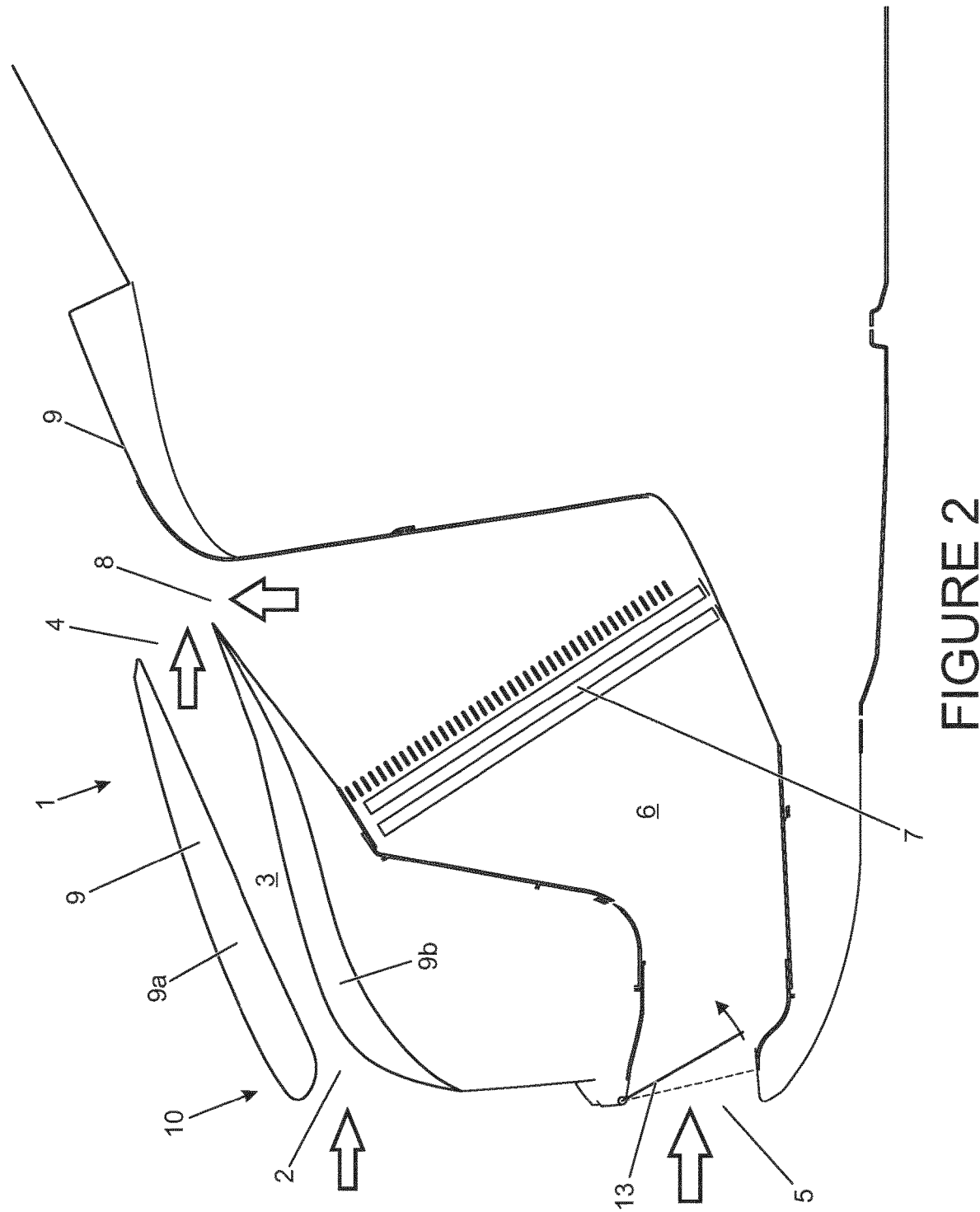
FIG. 2 is a cross-sectional view of the front part of a vehicle in accordance with an embodiment of the invention.
Figure 3:
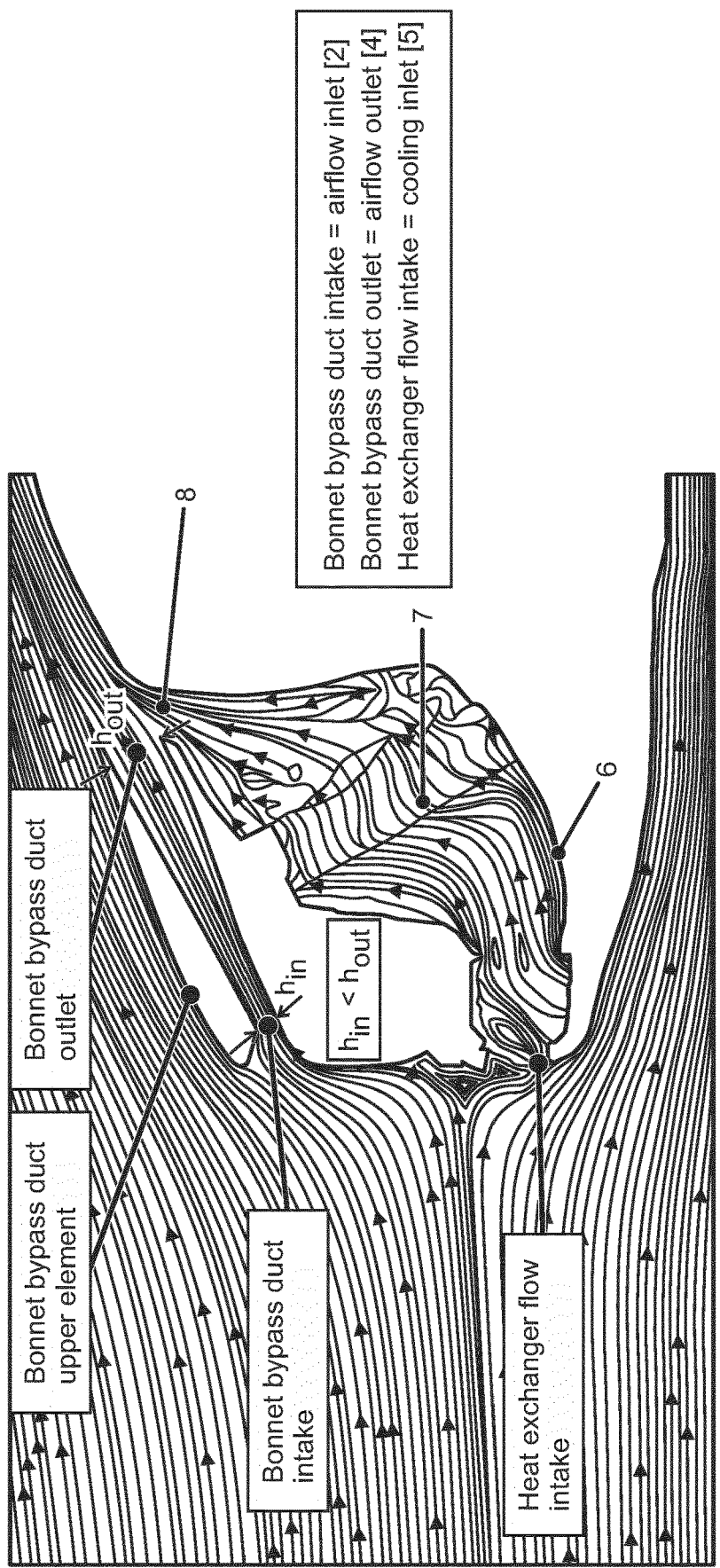
FIG. 3 is a schematic representation of the airflow around the front part of a vehicle in accordance with an embodiment of the invention.

The embodiment in FIG. 2 is similar to that of FIG. 1, except that the portion of the bonnet between the scoop and the windscreen is proportionally shorter. FIG. 2 is a cross sectional view taken down the centre line of the vehicle.

In the embodiment as shown in FIG. 2, the airflow inlet 2 to airflow duct 3 is situated between an upper section 9a and lower section 9b of the bonnet, so that the inlet is entirely defined by the bonnet. The airflow duct 3 directs air from the front face of the vehicle to the bonnet of the vehicle, and provides a longitudinal cross-sectional profile that is more aerodynamically favourable than that of the A-surface of the bonnet. In other embodiments the inlet 2 may be, at least partly, defined by the vehicle bodywork. In such cases the duct 3 can still be profiled such that it provides a more aerodynamically favourable longitudinal cross-sectional profile than the A-surface of the bonnet.

Airflow exits the airflow duct 3 at an airflow outlet 4 in the bonnet 9 of the vehicle 1. The arrows in FIGS. 1 and 2 generally indicate the airflow in each of the airflow duct 3 and cooling duct 6. The presence of the airflow duct 3 reduces the stagnation pressure on the front surfaces of the vehicle 1, desirably reducing aerodynamic drag. Airflow can be controlled dependent upon the relative cross-sectional areas of the airflow inlet 2 and outlet 4. For example, the cross-sectional area of the airflow inlet 2 could be less than the cross-sectional area of the airflow outlet 4, giving a diverging airflow duct profile. This could be achieved by the height of the airflow inlet $h_{in}$<the height of the airflow outlet $h_{out}$ as indicated in FIG. 3, or the width of the profile changing between the inlet and the outlet, or a combination of both the height and width changing, or the overall shape changing. The diverging airflow duct profile provides a diffusing flow, which improves efficiency of the duct, reducing aerodynamic drag.

Alternatively, the cross-sectional area of the airflow inlet could be greater than the cross-sectional area of the airflow outlet $A_{out}$, as a result of a converging airflow duct profile.

Figure 4:
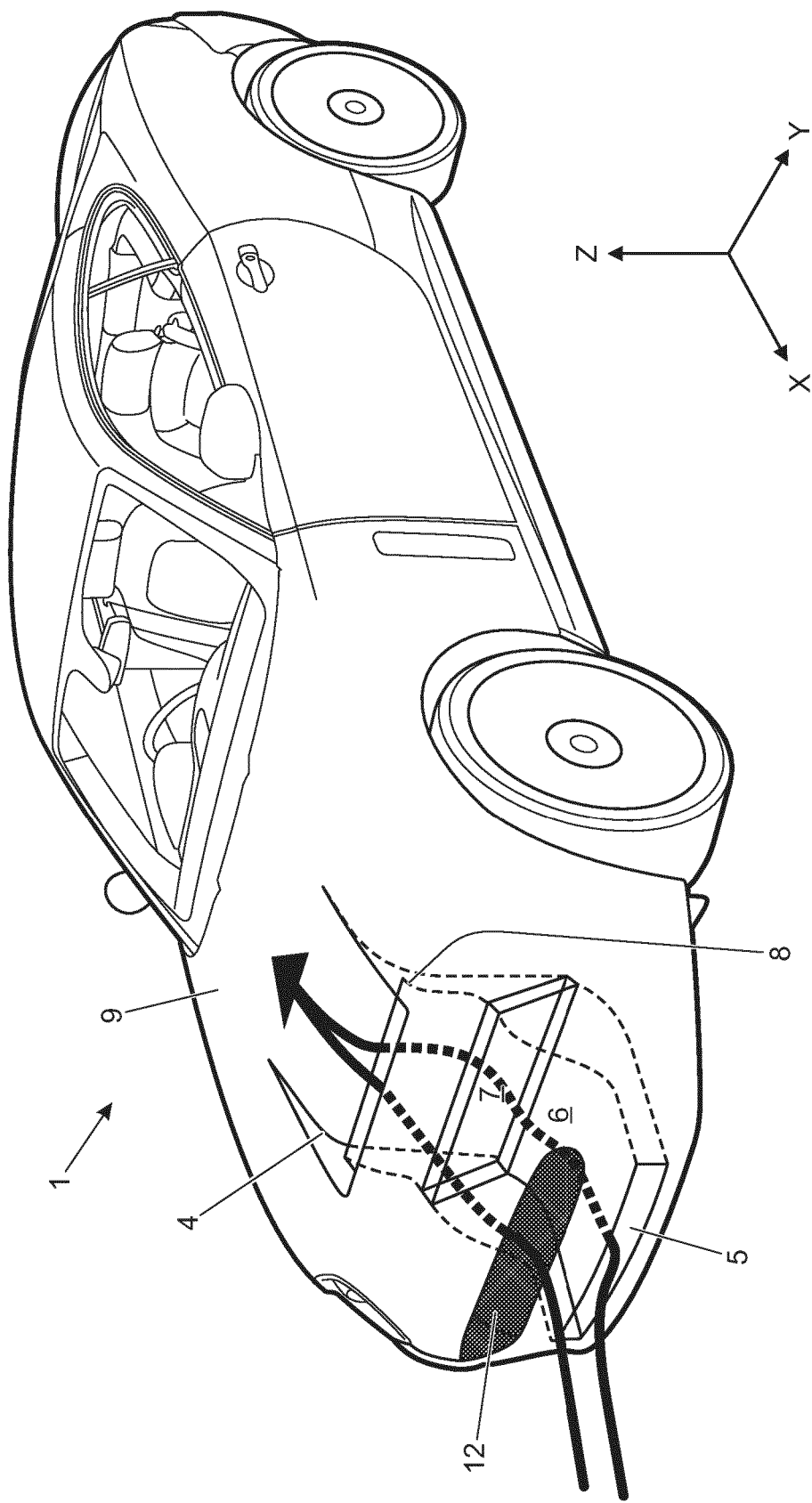
FIG. 4 is a front perspective view of a vehicle in accordance with an embodiment of the invention, including a deployable closure panel.

One or both of the airflow inlet 2 and the cooling inlet 5 may be provided with a deployable closure means (12, 13) moveable between a retracted position to open the respective inlet and a deployed position to close the respective inlet. The closure means may be in the form of a closure device such as a closure panel. Movement of the closure panel is controlled by a control means (not shown) and is dependent upon an operating parameter associated with the vehicle 1, for example current speed, engine temperature, heat exchanger temperature or the temperature of a fluid passing through the heat exchanger. The control means may be in the form of a control system or controller. The or each closure panel may have an outer surface which aligns with an outer surface of one or more body panels of the vehicle to form a substantially continuous exterior surface when the panel is in the deployed position as shown in FIG. 4. A deployable closure panel at the cooling inlet 5 may be in the form of a grille shutter system.

Although the airflow duct 3 and cooling duct 6 are separate from one another, their outlets (airflow outlet 4 and cooling outlet 8) are in proximity to one another such that the flow of air through the airflow outlet 4 influences the flow of air through the cooling outlet 8. The airflow outlet 4 may be coincident with the cooling outlet 8 such that the outlets have at least one point in common but the airflow duct 3 and cooling duct 6 are otherwise separate. Alternatively, the airflow outlet 4 may be adjacent to the cooling outlet 8 or even separated from the cooling outlet 8 so long as they are close enough for the airflow from the airflow outlet 4 to influence that through the cooling outlet 8. Typically the high velocity flow through the airflow outlet 4 will create a region of low pressure in the vicinity of the cooling outlet 8, causing an increase in flow through the cooling outlet 8 because of the favourable pressure gradient through the cooling duct 6. FIG. 3 shows representative flowlines through the airflow duct and cooling duct.

In this way, the airflow through the airflow duct 3 (which is concerned with aerodynamic drag by reducing stagnation pressure at the front of the vehicle) is coupled to the airflow through the cooling duct 6 (which is concerned with cooling components of the vehicle). The cross-sectional area of the airflow inlet 2 can be selected in order to balance airflow through the airflow inlet 2 relative to the airflow through the cooling inlet 5 so as not to "starve" the cooling duct 6 of air. Increasing the cross-sectional area of the airflow inlet, e.g. by increasing the height, $h_{in}$, of the airflow duct 3 reduces airflow into the cooling duct; reducing the cross-sectional area of the airflow inlet, e.g. by decreasing the height, $h_{in}$, of the airflow duct, increases airflow into the cooling duct 6.

Provision of all of the airflow inlet 2 and outlet 4, and cooling inlet 5 and outlet 8 only in the front part of the vehicle 1 preserves the side profile of the vehicle 1.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software to be executed on said computational device. A controller may be implemented in software run on one or more processors. Other suitable arrangements may also be used.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An airflow apparatus for a vehicle, the apparatus comprising:
    an airflow duct extending rearwardly from a front region of the vehicle, the airflow duct situated between an upper section of a bonnet of the vehicle and a lower section of the bonnet and having an airflow inlet in a front face of the vehicle and an airflow outlet in the bonnet;
    a cooling duct, separate from the airflow duct, the cooling duct having a cooling inlet in the front face of the vehicle and a cooling outlet in the bonnet, wherein:
    the airflow outlet is in proximity to the cooling outlet; and
    in use, the airflow duct directs air from the front face of the vehicle to the bonnet, the airflow exiting the airflow outlet substantially parallel the bonnet.

2. The apparatus according to claim 1, wherein, in use, airflow through the airflow outlet creates a region of low pressure in a vicinity of the cooling outlet that influences airflow through the cooling outlet.

3. The apparatus according to claim 1, wherein the airflow outlet is adjacent the cooling outlet.

4. The apparatus according to claim 1, wherein the proximity of the airflow outlet to the cooling outlet is such that, in use, airflow through the airflow outlet reduces pressure at the cooling outlet.

5. The apparatus according to claim 1, wherein the proximity of the airflow outlet to the cooling outlet is such that, in use, airflow through the airflow outlet increases airflow through the cooling outlet.

6. The apparatus according to claim 1, wherein the cooling duct includes a heat exchanger system from which heat can be removed by the airflow through the cooling duct.

7. The apparatus according to claim 1, wherein the cooling duct includes a deployable cooling duct closure panel adapted and arranged to close the cooling duct when in a deployed position and to open the cooling duct when in a retracted position.

8. The apparatus according to claim 1, wherein the airflow duct includes a deployable airflow duct closure panel adapted and arranged to close the airflow duct when in a deployed position and to open the airflow duct when in a retracted position.

9. The apparatus according to claim 7, wherein the deployable cooling duct closure panel is adapted and arranged to close the cooling inlet and/or the airflow inlet.

10. The apparatus according to claim 9, wherein the deployable cooling duct closure panel has an outer surface which aligns with an outer surface of one or more vehicle body panels when the deployable cooling duct closure panel is in the deployed position to form a substantially continuous exterior surface.

11. The apparatus according to claim 7, further comprising a controller configured to control deployment of the deployable cooling duct closure panel dependent upon an operating parameter associated with the vehicle.

12. The apparatus according to claim 11, wherein the operating parameter is one or more of a current speed of the vehicle, a temperature of a heat exchanger system or a temperature of fluid flowing through the heat exchanger system.

13. The apparatus according to claim 1, wherein a cross-sectional rea of the airflow inlet is less than a cross-sectional area of the airflow outlet.

14. A vehicle comprising the airflow apparatus according to claim 1.

15. A method of cooling one or more components of a vehicle, the method comprising:
   passing air through an airflow duct extending rearwardly from a front region of the vehicle, the airflow duct situated between an upper section of a bonnet of the vehicle and a lower section of the bonnet and having an airflow inlet in a front face of the vehicle and an airflow outlet in the bonnet;
   passing air through a cooling duct, separate from the airflow duct, the cooling duct having a cooling inlet in the front face of the vehicle and a cooling outlet in the bonnet;
   wherein the airflow outlet of the airflow duct is located in proximity to the cooling outlet of the cooling duct such that airflow through the airflow outlet creates a region of low pressure in a vicinity of the cooling outlet that influences airflow through the cooling outlet, and
   wherein, in use, the airflow duct directs air from a front face of the vehicle to the bonnet, the airflow exiting the airflow outlet substantially parallel the bonnet.

16. A method of modifying aerodynamic performance and simultaneously cooling of one or more components of a vehicle, the method comprising:
   in dependence on a determination that an operating parameter associated with the vehicle has satisfied at least one predetermined criterion, moving at least one deployable closure panel to one of a deployed position in which the at least one closure panel is positioned to close at least one of an airflow duct and a cooling duct and a retracted position in which the at least one closure panel is moved to open at least one of the airflow duct and the cooling duct;
   wherein the airflow duct is situated between an upper section of a bonnet of the vehicle and a lower section of the bonnet and has an airflow inlet in a front face of the vehicle and an airflow outlet in the bonnet;
   wherein the cooling duct, separate from the airflow duct, has a cooling inlet in the front face of the vehicle and a cooling outlet in the bonnet;
   wherein the airflow outlet and cooling outlet are located such that airflow through the airflow outlet creates a region of low pressure in a vicinity of the cooling outlet that influences airflow through the cooling outlet; and
   wherein airflow through the airflow duct modifies aerodynamic performance of the vehicle by reducing stagnation pressure at a front region of the vehicle.

* * * * *